United States Patent
Chen et al.

(10) Patent No.: US 9,937,639 B2
(45) Date of Patent: Apr. 10, 2018

(54) POWDER HEATING ASSEMBLY AND HEATING MODULE OF RAPID PROTOTYPING APPARATUS

(71) Applicant: MICROJET TECHNOLOGY CO., LTD., Hsinchu (TW)

(72) Inventors: Chin-Tsung Chen, Hsinchu (TW); Yen-Yu Lin, Hsinchu (TW); Kwo-Yuan Shi, Hsinchu (TW)

(73) Assignee: Microjet Technology Co., Ltd., Hsinchu (TW)

( * ) Notice: Subject to any disclaimer, the term of this patent is extended or adjusted under 35 U.S.C. 154(b) by 457 days.

(21) Appl. No.: 14/684,779

(22) Filed: Apr. 13, 2015

(65) Prior Publication Data

US 2015/0308741 A1 Oct. 29, 2015

(30) Foreign Application Priority Data

Apr. 23, 2014 (TW) .............................. 103114748 A

(51) Int. Cl.
*B29B 13/02* (2006.01)
*F26B 17/16* (2006.01)
(Continued)

(52) U.S. Cl.
CPC .......... *B29B 13/021* (2013.01); *B29C 64/165* (2017.08); *B29C 64/20* (2017.08); *B33Y 30/00* (2014.12); *B33Y 40/00* (2014.12); *F26B 17/16* (2013.01); *F26B 23/04* (2013.01); *F26B 25/04* (2013.01); *B29C 2035/0283* (2013.01)

(58) Field of Classification Search
CPC ............ B28B 1/001; B29C 2035/0283; B29B 13/021; F26B 17/16; F26B 25/04
See application file for complete search history.

(56) References Cited

U.S. PATENT DOCUMENTS

| 7,225,556 B2 * | 6/2007 | Tada .................. F26B 3/26 34/138 |
| 8,523,554 B2 * | 9/2013 | Tung .................. B33Y 30/00 222/233 |
| 2011/0223349 A1 * | 9/2011 | Scott .................. B22F 3/1055 427/532 |

FOREIGN PATENT DOCUMENTS

CN 201685457 U 12/2010
CN 202640658 1/2013
(Continued)

*Primary Examiner* — David J Laux
(74) *Attorney, Agent, or Firm* — Kirton McConkie; Evan R. Witt

(57) ABSTRACT

A powder heating assembly of a rapid prototyping apparatus includes a powder feeder and a heating module. The powder feeder includes an accommodation space and a powder falling port in communication with the accommodation space. The heating module is disposed under the powder feeder, and includes a thermally conductive cap and a heat conduction structure. The powder falling port is capped by the thermally conductive cap. The thermally conductive cap includes a powder exhaust port. The powder exhaust port is in communication with the powder falling port. The heat conduction structure is arranged between the accommodation space of the powder feeder and the thermally conductive cap and includes a heater. The heat generated by the heater is transferred to the construction powder within the powder feeder to preheat the construction powder, remove the moisture contained in the construction powder and dry the construction powder.

10 Claims, 4 Drawing Sheets

(51) Int. Cl.
*F26B 25/04* (2006.01)
*F26B 23/04* (2006.01)
*B29C 35/02* (2006.01)
*B33Y 30/00* (2015.01)
*B33Y 40/00* (2015.01)
*B29C 64/165* (2017.01)
*B29C 64/20* (2017.01)

(56) References Cited

FOREIGN PATENT DOCUMENTS

| | | |
|---|---|---|
| CN | 202928311 U | 5/2013 |
| DE | 102010034311 A1 | 2/2012 |
| TW | 200415334 A | 8/2004 |
| TW | I378035 | 12/2012 |

\* cited by examiner

POWDER HEATING ASSEMBLY AND HEATING MODULE OF RAPID PROTOTYPING APPARATUS

FIELD OF THE INVENTION

The present invention relates to a powder heating assembly and a heating module, and more particularly to a powder heating assembly and a heating module of a rapid prototyping apparatus having a function of preheating construction powder within a powder feeder.

BACKGROUND OF THE INVENTION

As known, a rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Nowadays, the rapid prototyping technology is widely applied to the three-dimensional (3D) printing methods. For example, a binder jetting technology (also known as an inkjet powder printing technology) is one of the 3D printing methods. For example, by combining a precise inkjet printing technology and a precise carrier positioning technology, a three-dimensional physical model can be produced. The producing method begins by first spreading a layer of powder on the carrier and then printing high viscosity liquid binder on part of the powder by using the precise inkjet printing technology, so that the liquid binder and the powder stick together to become solidified. After the above steps are repeatedly done, a three-dimensional physical model is produced by stacking multiple layers.

FIG. 1A is a schematic perspective view illustrating a conventional rapid prototyping apparatus. As shown in FIG. 1A, the conventional rapid prototyping apparatus 1 comprises a powder feeder 10, a construction platform 11, a construction chamber 12, a printing module 13 and a liquid supply module 14. The powder feeder 10 is disposed over the construction platform 11 for accommodating construction powder (not shown) and feeding the construction powder to the construction platform 11. Then, the construction powder on the construction platform 11 is pushed to the construction chamber 12 by a spreading element (not shown), which is linked with the printing module 13. Then, high viscosity liquid binder is printed on the construction powder by the printing module 13. Consequently, the liquid binder and the powder stick together to become solidified. The liquid supply module 14 is in communication with the printing module 13 for supplying the liquid binder. After the above steps are repeatedly done, a three-dimensional physical object is produced in the construction chamber 12 by stacking multiple layers.

Regardless of the size of the three-dimensional physical object or the improvement of the rapid prototyping apparatus, it usually takes several hours or several tens of hours to produce the three-dimensional physical object. Whenever the high viscosity liquid binder is printed on the construction powder, it takes a drying time to wait for the formation of the construction layer. Consequently, the process of stacking the multiple layers is time-consuming. Moreover, after the three-dimensional object is produced, a high temperature heating process is performed to thermally treat the three-dimensional object so as to increase the structural strength of the three-dimensional object. If the structural strength is insufficient, the possibility of causing damage of the three-dimensional object is increased. In other words, the time cost of the rapid prototyping process is very high.

Moreover, the conventional rapid prototyping process is largely affected by the ambient humidity. For example, if the ambient humidity is higher, the moisture of the construction powder is higher. Under this circumstance, the procedure of falling down the construction powder and the procedure of spreading the construction powder are adversely affected, and thus the performance of the three-dimensional object is deteriorated. FIG. 1B is a schematic cross-sectional view illustrating the conventional rapid prototyping apparatus of FIG. 1A. For increasing the drying rate, the conventional rapid prototyping apparatus 1 is usually equipped with a hot air dryer 15. The hot air dryer 15 is disposed over the construction chamber 12. While the rapid prototyping process within the construction chamber 12 is performed, the construction powder is heated by the hot air dryer 15. Consequently, the drying rate is enhanced. Although the construction powder within the construction chamber 12 is quickly dried, there are still some drawbacks. For example, the heat absorbed by the construction powder will be transferred to the inner components of the conventional rapid prototyping apparatus 1 and radiated to the near component (e.g. the printing module 13). Owing to the high ambient temperature of the hot air dryer 15, some nozzles of the printing module 13 are possibly clogged. Consequently, the print pattern printed by the printing module 13 contains thin white lines corresponding to clogged nozzles, and the quality of the three-dimensional object is impaired. Moreover, the use lives of the inner components of the rapid prototyping apparatus 1 and the printing module 13 will be shortened.

For solving the above drawbacks, there is a need of providing a powder heating assembly and a heating module of a rapid prototyping apparatus so as to increase the forming speed and the quality of the three-dimensional object.

SUMMARY OF THE INVENTION

An object of the present invention provides a powder heating assembly and a heating module of a rapid prototyping apparatus for preheating the construction powder. Consequently, the speed of the rapid prototyping process is increased, the quality of the three-dimensional object is enhanced and the use life of the rapid prototyping apparatus is extended.

In accordance with an aspect of the present invention, there is provided a powder heating assembly of a rapid prototyping apparatus. The powder heating assembly includes a powder feeder and a heating module. The powder feeder includes an accommodation space and a powder falling port in communication with the accommodation space. A construction powder is accommodated within the accommodation space. The heating module is disposed under the powder feeder, and includes a thermally conductive cap and a heat conduction structure. The powder falling port is capped by the thermally conductive cap. The thermally conductive cap includes a powder exhaust port. The powder exhaust port is in communication with the powder falling port. The heat conduction structure is arranged between the accommodation space of the powder feeder and the thermally conductive cap and includes a heater. The heat generated by the heater is transferred to the construction powder within the powder feeder through the heat conduction structure to preheat the construction powder, remove the moisture contained in the construction powder and dry the construction powder. After the dried construction powder is ejected out of the powder exhaust port, a powder spreading process is performed.

In accordance with another aspect of the present invention, there is provided a heating module for a powder feeder of a rapid prototyping apparatus. The powder feeder accommodates a construction powder. The heating module includes a thermally conductive cap and a heat conduction structure. The thermally conductive cap is disposed within the powder feeder. The powder feeder is capped by the thermally conductive cap. A powder exhaust port is defined by the thermally conductive cap and the powder feeder collaboratively. The heat conduction structure is disposed within the powder feeder and contacted with the thermally conductive cap. A heater is disposed within the heat conduction structure. The heat generated by the heater is transferred to the construction powder within the powder feeder through the heat conduction structure to preheat the construction powder, remove the moisture contained in the construction powder and dry the construction powder. After the dried construction powder is ejected out of the powder exhaust port, a powder spreading process is performed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
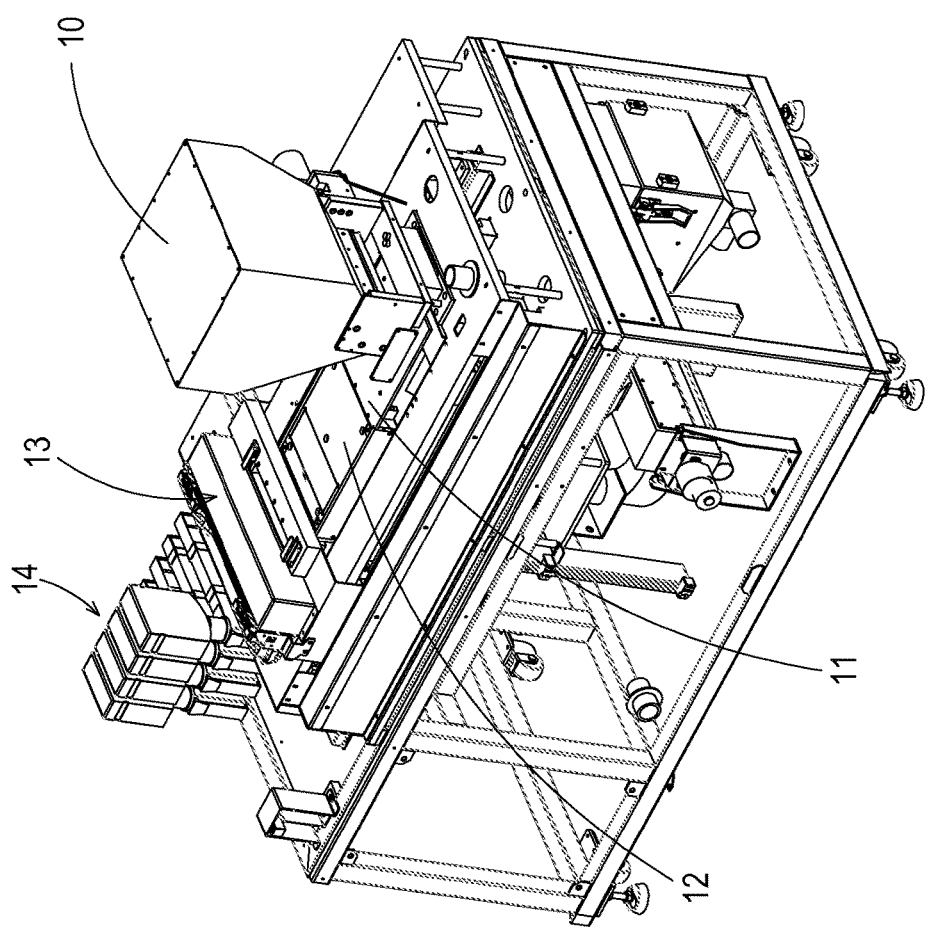
FIG. 1A is a schematic perspective view illustrating a conventional rapid prototyping apparatus.
Figure 1B:
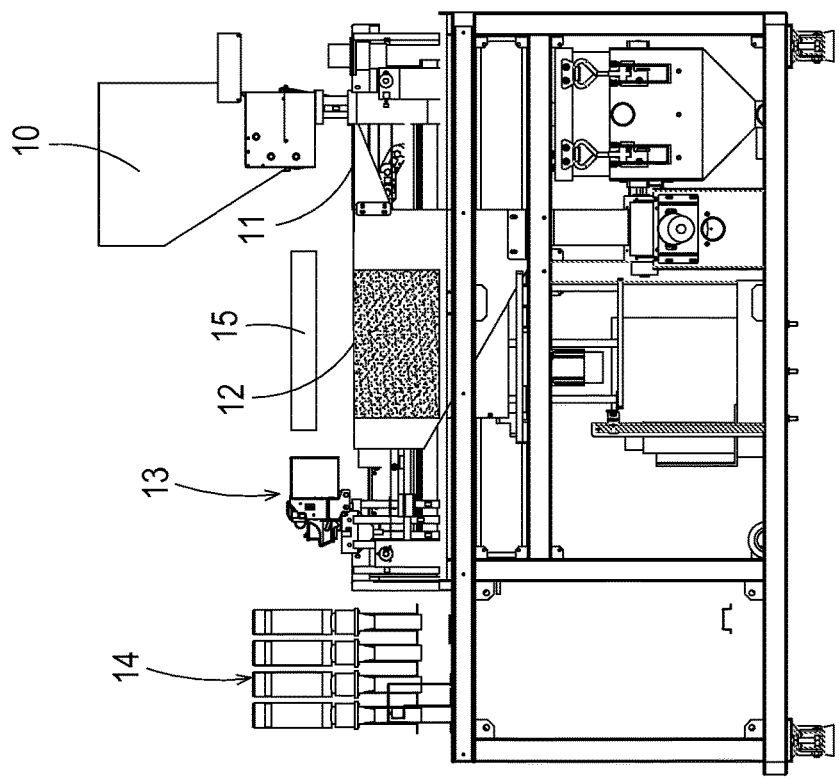
FIG. 1B is a schematic cross-sectional view illustrating the conventional rapid prototyping apparatus of FIG. 1A.
Figure 2A:
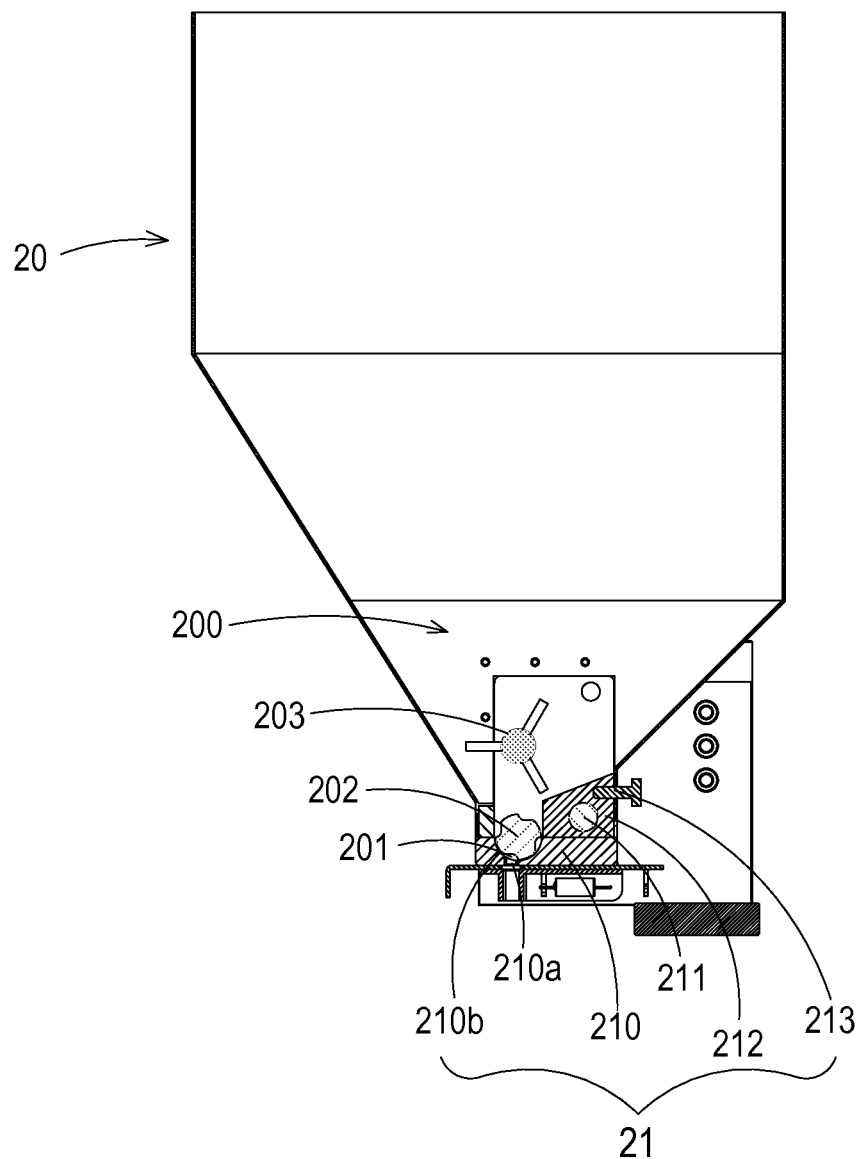
FIG. 2A is a schematic cross-sectional view illustrating a powder heating assembly according to an embodiment of the present invention.

FIG. 2A is a schematic cross-sectional view illustrating a powder heating assembly according to an embodiment of the present invention. The powder heating assembly 2 is used for a rapid prototyping apparatus (not shown). The powder heating assembly 2 comprises a powder feeder 20 and a heating module 21. The heating module 21 is disposed under the powder feeder 20. The powder feeder 20 comprises an accommodation space 200 and a powder falling port 201. The heating module 21 comprises a thermally conductive cap 210 and a heat conduction structure 211. The powder falling port 201 of the powder feeder 20 is capped by the thermally conductive cap 210. Moreover, the thermally conductive cap 210 comprises a powder exhaust port 210b. The powder exhaust port 210b is in communication with the powder falling port 201 of the powder feeder 20. The heat conduction structure 211 is arranged between a lower portion of the accommodation space 200 and the thermally conductive cap 210 and contacted with the thermally conductive cap 210. Moreover, a heater 212 is disposed within the heat conduction structure 211. The heat generated by the heater 212 is transferred to the construction powder within the lower portion of the accommodation space 200 through the heat conduction structure 211 so as to preheat the construction powder. Consequently, the moisture contained in the construction powder is removed, and the construction powder is dried. After the dried construction powder is ejected from the heating module 21 through the powder exhaust port 210b of the thermally conductive cap 210, a powder spreading process is performed.

Please refer to FIG. 2A again. Preferably but not exclusively, the powder feeder 20 is hopper-shaped. The accommodation space 200 is disposed within the powder feeder 20 for accommodating the construction powder (not shown). The powder falling port 201 is located at a bottom of the hopper-shaped powder feeder 20. The construction powder within the accommodation space 200 falls down to the powder falling port 201. In some embodiments, a stirrer 203 is disposed within the accommodation space 200 of the powder feeder 20. An example of the stirrer 203 includes but is not limited to a stirring rod or a stirring paddle. The construction powder within the accommodation space 200 is stirred by the stirrer 203. In some embodiments, the powder feeder 20 further comprises a powder amount control bar 202. The powder amount control bar 202 is located at the powder falling port 201 for controlling the amount of the construction powder to be ejected out.

As mentioned above, the heating module 21 is located at the lower portion of the accommodation space 200 of the powder feeder 20 for preheating the construction powder before the powder spreading process is performed. Consequently, the moisture contained in the construction powder is removed, and the construction powder is dried. The heating module 21 comprises the thermally conductive cap 210 and the heat conduction structure 211. The powder falling port 201 of the powder feeder 20 is capped by the thermally conductive cap 210. In this embodiment, the thermally conductive cap 210 comprises a receiving recess 210a and the powder exhaust port 210b. An example of the receiving recess 210a includes but is not limited to a concave structure. The powder amount control bar 202 of the powder feeder 20 is partially accommodated within the receiving recess 210a. The powder exhaust port 210b is located at the bottom of the receiving recess 210a. Moreover, the powder exhaust port 210b is in communication with the powder falling port 201 is located at a bottom of the powder feeder 20.

The heat conduction structure 211 is arranged between the powder feeder 20 and the thermally conductive cap 210. In other words, the heat conduction structure 211 is disposed within the lower portion of the powder feeder 20. A first side of the heat conduction structure 211 has a large area in contact with the construction powder within the accommodation space 200. A second side of the heat conduction structure 211 is connected with the thermally conductive cap 210. Via the heat conduction structure 211, the heat generated by the heater 212 is transferred to the construction powder within the accommodation space 200 and to the thermally conductive cap 210. The heater 212 is disposed within the heat conduction structure 211 for generating the heat. Preferably but not exclusively, the heating module 21 further comprises a temperature sensor 213. The temperature sensor 213 is disposed within the heat conduction structure 211 for sensing and adjusting the heating temperature of the heater 212. In this embodiment, the thermally conductive cap 210 and the heat conduction structure 211 are made of the materials with high thermal conductivity. For example, the thermally conductive cap 210 and the heat conduction structure 211 are made of metallic materials such as aluminum.

Figure 2B:
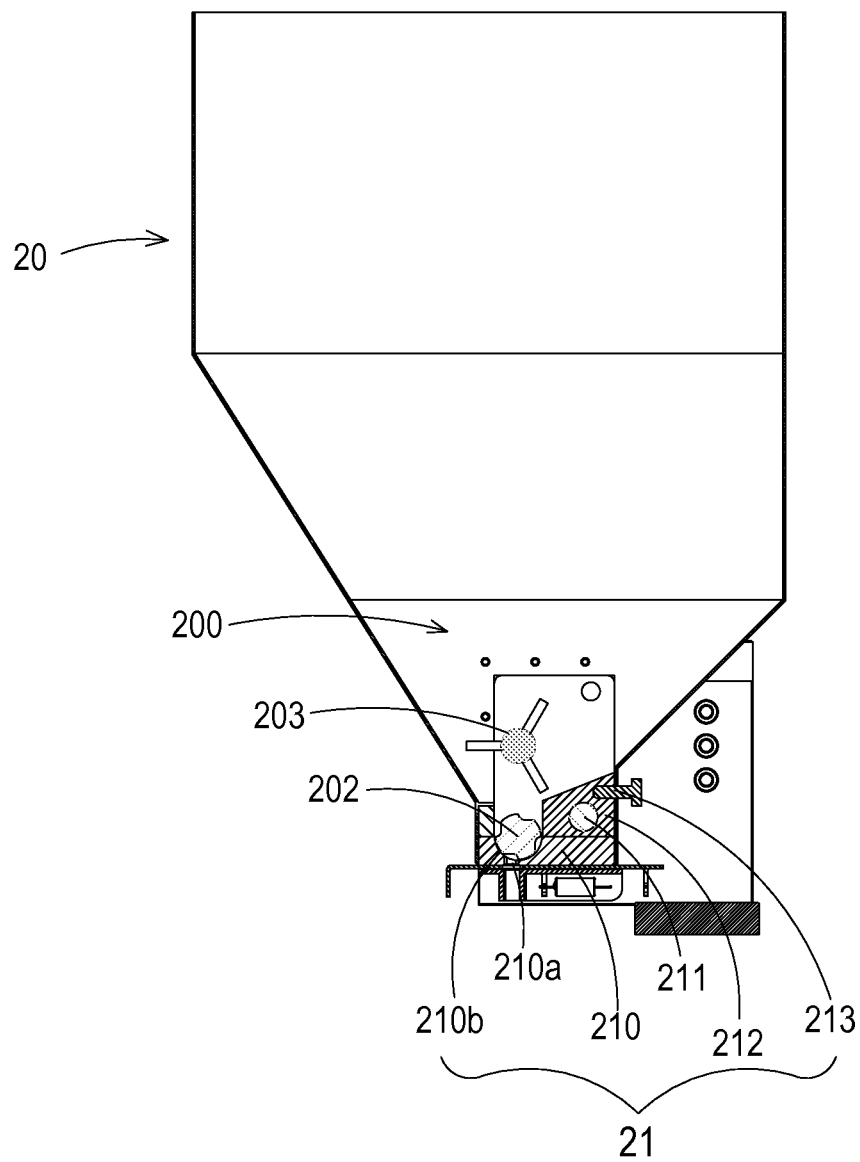
FIG. 2B is a schematic cross-sectional view illustrating a variant example of the powder heating assembly of FIG. 2A.

It is noted that numerous modifications and alterations may be made while retaining the teachings of the invention. FIG. 2B is a schematic cross-sectional view illustrating a variant example of the powder heating assembly of FIG. 2A. In this embodiment, the heating module 21 is disposed within the powder feeder 20, and the powder feeder 20 is capped by the thermally conductive cap 210. A powder exhaust port 210b is defined by the thermally conductive cap 210 and the powder feeder 20 collaboratively. The heat conduction structure 211 is disposed within the accommodation space 200 and contacted with the thermally conductive cap 210. Consequently, the construction powder within the powder feeder 20 is heated by the heating module 21 directly.

Moreover, the heating module 21 further comprises a heater 212 and a temperature sensor 213. The heater 212 is disposed within the heat conduction structure 211. The temperature sensor 213 is disposed within the heat conduction structure 211 for sensing and adjusting the heating temperature of the heater 212. The powder feeder 20 further comprises a powder amount control bar 202. A receiving recess 210a is located beside the powder exhaust port 210b. The powder amount control bar 202 is located at the receiving recess 210a for controlling the amount of the construction powder to be ejected out. In this embodiment, the thermally conductive cap 210 and the heat conduction structure 211 are made of the materials with high thermal conductivity. For example, the thermally conductive cap 210 and the heat conduction structure 211 are made of metallic materials such as aluminum.

Consequently, the heater 212 of the powder heating assembly 2 of the present invention is capable of preheating the construction powder within the accommodation space 200 of the powder feeder 20 through the heat conduction structure 211. Moreover, while the construction powder within the accommodation space 200 of the powder feeder 20 is heated, the construction powder is stirred by the stirrer 203, so that the heat is transferred to the construction powder more uniformly. After the moisture contained in the construction powder is removed, the dried construction powder is produced. Then, the dried construction powder is transmitted to the receiving recess 210a of the thermally conductive cap 210 through the powder amount control bar 202. After the dried construction powder is ejected out of the powder exhaust port 210b, the powder spreading process is performed.

From the above descriptions, the present invention provides a powder heating assembly and a heating module of a rapid prototyping apparatus. The heating module is located near the powder exhaust port for preheating the construction powder. After the dried construction powder is ejected out of the powder exhaust port, a powder spreading process is performed. Consequently, the influences of the ambient humidity on the procedure of falling down the construction powder and the procedure of spreading the construction powder will be minimized, and the printing quality of the three-dimensional object is enhanced. Moreover, since the construction powder is preheated before the powder spreading process, the construction layer is more compact and smoother. Moreover, after the dried construction powder is spread to the construction chamber, the temperature of the construction layer is substantially equal to the drying temperature of the construction powder. The inner components of the rapid prototyping apparatus and the printhead structure of the printing module are not adversely affected by this drying temperature. In particular, during the rapid prototyping process, the dried construction powder and the liquid binder can stick together at a faster rate. In comparison with the conventional technology, the powder heating assembly and the heating module of the present invention can preheat the construction powder before the powder spreading process. Consequently, the speed of the rapid prototyping process is increased, the quality of the three-dimensional object is enhanced and the use life of the rapid prototyping apparatus is extended.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A powder heating assembly of a rapid prototyping apparatus, the powder heating assembly comprising:
    a powder feeder comprising an accommodation space and a powder falling port in communication with the accommodation space, wherein a construction powder is accommodated within the accommodation space;
    a heating module disposed under the powder feeder, and comprising a thermally conductive cap and a heat conduction structure, wherein the powder falling port is capped by the thermally conductive cap, the thermally conductive cap comprises a powder exhaust port, and the powder exhaust port is in communication with the powder falling port, wherein the heat conduction structure is arranged between the accommodation space of the powder feeder and the thermally conductive cap and comprises a heater, wherein the heat generated by the heater is transferred to the construction powder within the powder feeder through the heat conduction structure and the thermally conductive cap to preheat the construction powder accommodated within a bottom of the accommodation space, remove the moisture contained in the construction powder and dry the construction powder, wherein after the dried construction powder is ejected out of the powder exhaust port, a powder spreading process is performed.

2. The powder heating assembly according to claim 1, wherein a stirrer is further disposed within the accommodation space of the powder feeder for stirring the construction powder.

3. The powder heating assembly according to claim 1, wherein the powder feeder further comprises a powder amount control bar, wherein the powder amount control bar is located at the powder falling port.

4. The powder heating assembly according to claim 3, wherein the thermally conductive cap further comprises a receiving recess, wherein the powder amount control bar is partially accommodated within the receiving recess.

5. The powder heating assembly according to claim 1, wherein the heating module further comprises a temperature sensor, wherein the temperature sensor is disposed within the heat conduction structure for sensing and adjusting a heating temperature of the heater.

6. The powder heating assembly according to claim 1, wherein each of the thermally conductive cap and the heat conduction structure is made of aluminum.

7. A heating module for a powder feeder of a rapid prototyping apparatus, the powder feeder accommodating a construction powder, the heating module comprising:
   a thermally conductive cap disposed within the powder feeder, and the powder feeder is capped by the thermally conductive cap, wherein a powder exhaust port is defined by the thermally conductive cap and the powder feeder collaboratively; and
   a heat conduction structure disposed within the powder feeder and contacted with the thermally conductive cap, wherein a heater is disposed within the heat conduction structure,
   wherein the heat generated by the heater is transferred to the construction powder within the powder feeder through the heat conduction structure and the thermally conductive cap to preheat the construction powder accommodated within a bottom of the accommodation space, remove the moisture contained in the construction powder and dry the construction powder, wherein after the dried construction powder is ejected out of the powder exhaust port, a powder spreading process is performed.

8. The heating module according to claim 7, wherein the powder feeder further comprises a powder amount control bar, and a receiving recess is located beside the powder exhaust port, wherein the powder amount control bar is partially accommodated within the receiving recess.

9. The heating module according to claim 7, wherein the heating module further comprises a temperature sensor, wherein the temperature sensor is disposed within the heat conduction structure for sensing and adjusting a heating temperature of the heater.

10. The heating module according to claim 7, wherein each of the thermally conductive cap and the heat conduction structure is made of aluminum.

* * * * *